W. A. DE HART.
FARE REGISTERING APPARATUS.
APPLICATION FILED OCT. 4, 1909.

1,122,262.

Patented Dec. 29, 1914.
6 SHEETS—SHEET 1.

WITNESSES:

INVENTOR
W. A. De Hart
BY
ATTORNEYS

W. A. DE HART.
FARE REGISTERING APPARATUS.
APPLICATION FILED OCT. 4, 1909.

1,122,262.

Patented Dec. 29, 1914.
6 SHEETS—SHEET 2.

W. A. DE HART.
FARE REGISTERING APPARATUS.
APPLICATION FILED OCT. 4, 1909.

1,122,262.

Patented Dec. 29, 1914.
6 SHEETS—SHEET 3.

W. A. DE HART.
FARE REGISTERING APPARATUS.
APPLICATION FILED OCT. 4, 1909.

1,122,262.

Patented Dec. 29, 1914.
6 SHEETS—SHEET 6.

WITNESSES
INVENTOR
W. A. De Hart
BY
Duell, Warfield & Duell
ATTORNEYS

UNITED STATES PATENT OFFICE.

WILLIAM A. DE HART, OF NEW YORK, N. Y., ASSIGNOR TO JAY M. JOHNSON, OF CHICAGO, ILLINOIS.

FARE-REGISTERING APPARATUS.

1,122,262.  Specification of Letters Patent.  Patented Dec. 29, 1914.

Application filed October 4, 1909. Serial No. 520,947.

*To all whom it may concern:*

Be it known that I, WILLIAM A. DE HART, a citizen of the United States, residing at New York, in the county of New York and State of New York, have invented certain new and useful Improvements in Fare-Registering Apparatus, of which the following is a full, clear, and exact description, such as will enable others skilled in the art to which it appertains to make and use the same.

This invention relates to fare-registers and with regard to the more specific features thereof, to devices of this character for use on street railway cars.

One of the objects of the invention is to provide a practical device of this general nature which will keep an accurate and complete account of the money which is placed therein.

Another object is to provide an effective device of this character designed to prevent employees from retaining any of the receipts of the company and yet give them access thereto, as for making change.

Further objects are to provide a device of the above type which is of compact and durable construction and proof against accidental or intentional misuse.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawing, which represents one of various possible embodiments of my invention, and in which similar reference characters refer to similar parts throughout the several figures.

Figure 1:
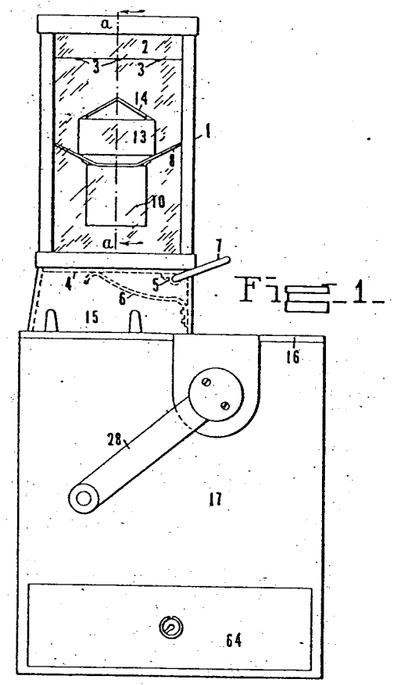
Figure 1 is a front elevation.
Figure 2:
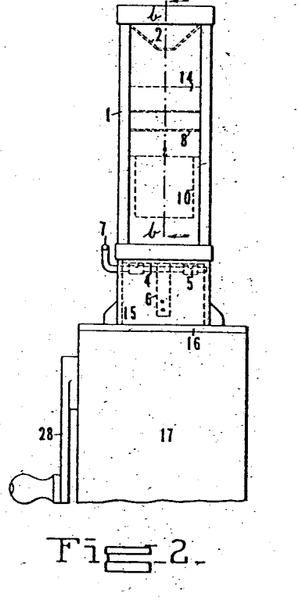
Fig. 2 is a side elevation, parts being broken away.
Figure 3:
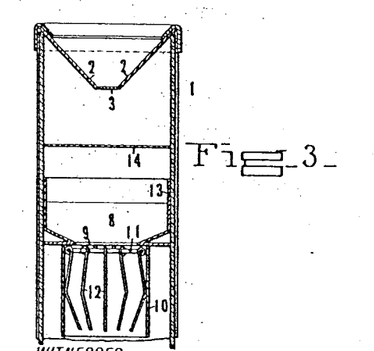
Fig. 3 is a cross-section taken on line *a—a* of Fig. 1.
Figure 4:
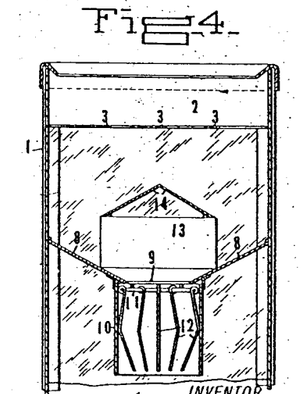
Fig. 4 is a cross-section taken on line *b—b* of Fig. 2.

Referring to Fig. 1 of the drawings, 1 indicates a box or coin receptacle, the front and rear walls of which are preferably constructed of some transparent material as glass, provided with an open top from which the converging guides 2, 2 of the chute extend downwardly, their lower edges being separated from one another sufficiently to permit a coin to pass therebetween. Suitable bridging pieces 3 extend across the opening formed between the lower edges of the members 2 and are secured thereto in any suitable manner, said bridging pieces being spaced from one another and forming a grating to permit coins of certain sizes only to pass therebetween. In the present instance, these bridging pieces will permit the passage of nickels, dimes and pennies, but will prevent the passage of all coins larger than five-cent pieces.

Receptacle 1 is provided with a tilting bottom 4, which is preferably pivoted at one end 5, as shown in the drawings, and is normally retained in its uppermost or closed position by means of a suitable spring 6. The handle 7, secured to said bottom, is employed for swinging the same about its pivotal point when it is desired to allow the coins deposited within the box to pass into the other parts of the apparatus, as hereinafter described. Interposed between the chute 2 and the bottom 4 of this receptacle is a partition 8, attached to the sides of the receptacle in any convenient manner as by soldering. The partition inclines downwardly from the sides to a central horizontal portion, which is provided with an aperture 9 for the passage of coins. Depending from the portion 8 is a tube 10 of proper size and form to surround the aperture 9 and within this tube 10, adjacent the aperture 9, a ring 11 is located, which conforms closely with the inner wall of the tube. Suspended from this ring are a plurality of wires 12, which normally occupy the position shown in the drawing, but adapted, should the fare-register be turned upside down, to fall together at their free ends and effectually close the opening through the tube 10. Supported upon the partition 8 and attached thereto in any convenient manner, are two outwardly and upwardly extending members 13 which in turn support a roof-like coin guide 14 at their upper corners.

Figure 5:
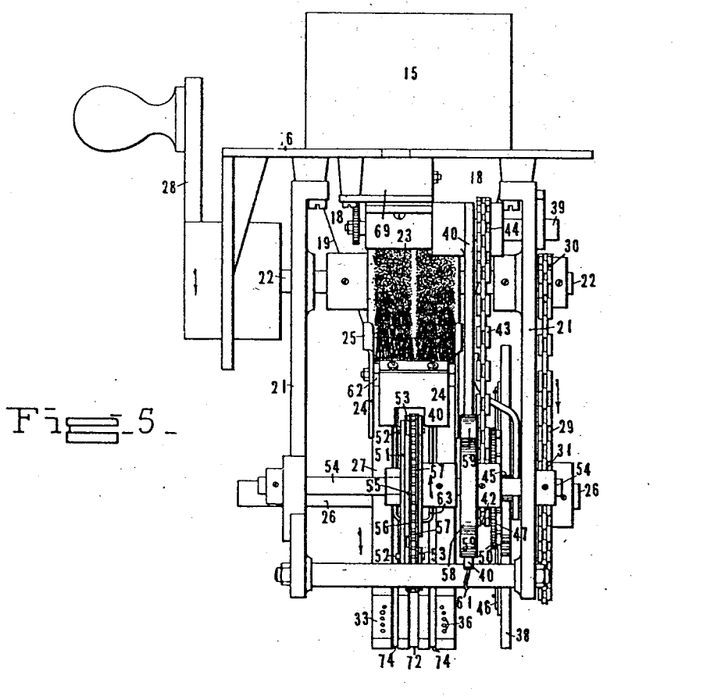
Fig. 5 is a side elevation with the coin receptacle and casing removed.
Figure 6:
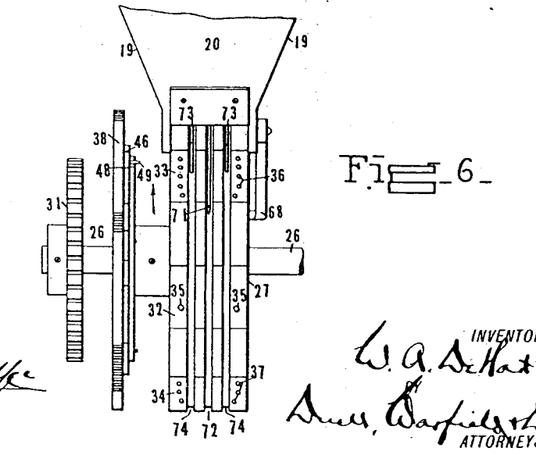
Fig. 6 is a detail view of the coin removing means and parts associated therewith.
Figure 7:
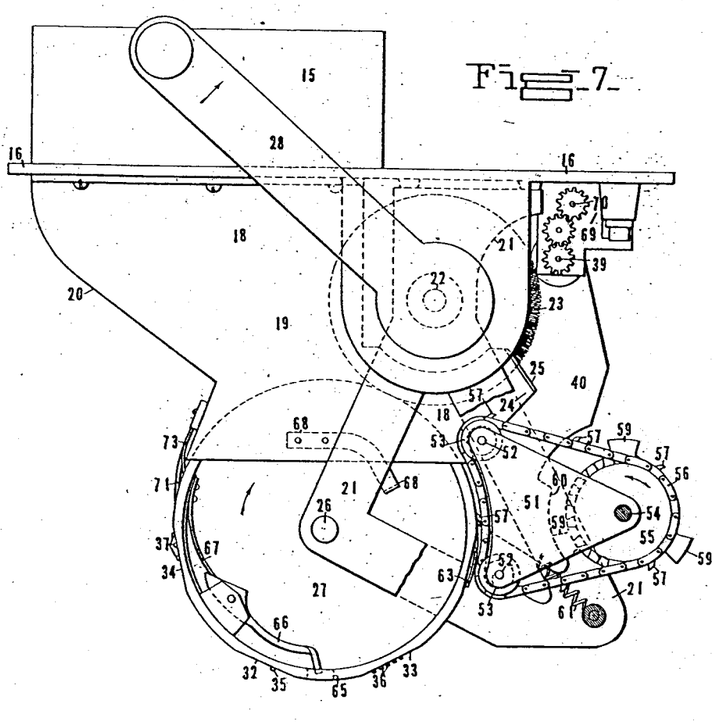
Fig. 7 is a front elevation of the coin removing and registering mechanism partly in section.
Figure 8:
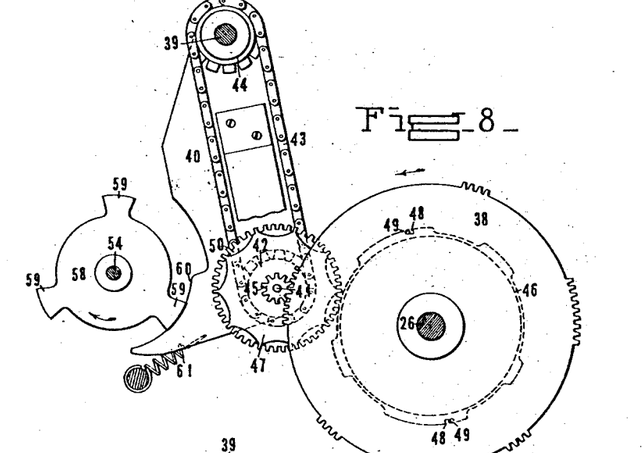
Fig. 8 is a detail view of the register actuating mechanism in position to register the removal of a ten-cent piece.

The operation of the invention, as far as described, is as follows: Upon coins of the proper denomination being dropped into the top of the receptacle 1, they pass down the chute 2 and through the grating at the bottom thereof, and falling upon the sloping member 14 and the inclined portions of the partition 8, slide down to the horizontal portion of said partition and through the aperture therein. When the apparatus is in its normal position, the members 12 afford free passage of the coins through the tube 10, whence they fall upon the tilting bottom 4. The transparent sides permit the conductor to inspect the coins within the box, after which by a movement of the handle 7, the tilting bottom can be dropped to allow the coins to pass out of the receptacle. It is to be understood that by blocking the tube when the fare-register is in an inverted position, the members 12 prevent the removal of coins therefrom. The member 14 is interposed above the aperture 9 to prevent interference with the members 12 by the insertion of an implement through the openings in the chute. Now, continuing with the description, the receptacle 1 is preferably provided with a base 15 which is secured to an upper portion or cover plate 16 of a casing 17. As the bottom of the receptacle is tilted after the coins have been inspected, they drop into a receiver or hopper 18 comprising side walls 19 and an end wall 20, which are secured to the upper portion of the casing in any suitable manner. Also supported by cover 16 is a depending frame 21, within which is journaled a shaft 22, and secured to the latter is a circular brush 23 having bristles of some relatively stiff material, preferably metallic. This brush projects within the front end of the receiver 18, between the side walls thereof, and the bristles are kept in compa form by means of wings 24 extending forwardly from said side walls, and preferably having their outer ends flared slightly outward, as shown at 25 in Fig. 5. Also journaled within the frame 21 is a shaft 26, upon which a drum 27 is secured in any suitable manner, said drum extending within the receiver 18, and having its peripheral surface engaged by the brush 23, as clearly shown in Fig. 7. A suitable crank 28 is secured to the shaft 22 whereby it may be rotated, and rotary motion is simultaneously imparted to the shaft 26 by any suitable means, such as a sprocket chain 29 engaging sprocket wheels 30 and 31 mounted on shafts 22 and 26 respectively.

In order to selectively remove the coins from within the receiver the peripheral surface of the drum 27 is provided with a plurality of flattened portions 32, 33 and 34. The length of each of the portions 32 is slightly greater than the diameter of a five-cent piece and is provided with pins 35 adapted to engage and retain a five-cent piece thereon, but spaced from one another sufficiently to permit pennies or dimes to pass therebetween. In the embodiment shown there are provided three such portions, but it will, of course, be understood that this invention is not limited to any particular number thereof.

The length of each of the portions 33 is slightly greater than the diameter of a penny and is provided with pins 36 adapted to engage and retain pennies thereon, said pins being spaced from one another sufficiently to permit a ten-cent piece to pass therebetween. The pins 36 upon these portions 33 will also engage five-cent pieces which are of greater diameter than the pennies, but such pieces, when engaged by the pins, will project forwardly and overhang the flattened portion, for a purpose hereinafter described. In the embodiment shown the drum is provided with two such flattened portions.

The length of each of the flattened portions 34 is slightly greater than the diameter of a ten-cent piece and is provided with pins 37 adapted to engage and retain ten-cent pieces thereon. These pins will, of course, engage pennies and five-cent pieces, but such pieces, when thus retained, will project forwardly and overhang the flattened portion. In the embodiment shown the drum is provided with two such flattened portions.

The operation of the removing mechanism is as follows: After the coins have been deposited by the passengers, boarding a car, they pass through the box, as heretofore described, and rest upon the tilting bottom 4. The conductor then, after inspecting the coins, tilts the bottom down by means of the handle 7, permitting the coins thereon to slide off and fall into the receiver 18, and releases the handle, permitting the bottom plate 4 to snap up into place. The crank 28 is then rotated in the direction indicated by the arrow, thus rotating the brush 23 and the drum 27 in a direction indicated by arrows in Fig. 7. As the different flattened portions of the drum pass toward the right, with reference to Fig. 7, the pins upon the various flattened portions will engage with the coins and carry them forward in the following manner: The pins 35 associated with the flattened portions 32 will engage and carry forward five-cent pieces only; the pins 36 associated with the flattened portions 33 will engage and move forward pennies or five-cent pieces. If, however, a five-cent piece is so carried, its overhanging portion will be engaged by the bristles of the rotating brush and the coin will be thrown upward and disengaged from the pins, thereby preventing five-cent pieces from being carried out of the receiver by the penny engaging pins. The pennies, however, which are engaged by said pins will lie wholly upon said flattened portions and will be carried past the brush out of the receiver. In a similar manner the pins 37 associated with the flattened portions 34 are permitted to remove ten-cent pieces only from the receiver, for pennies or five-cent pieces, which may be caught thereby, will have their overhanging portions engaged by the brush and be thrown back into the receiver in the manner above described. It will thus be seen that these parts permit the coins to be selectively removed from the receiver.

A spring member 71, which may be supported upon the walls of the receiver in any suitable manner, engages the central groove 72 formed in the drum at its rearward portion, in order to strip off any coins which might adhere to the drum, and spring members 73 are provided for engaging the outer grooves 74 to prevent coins from sliding backwardly out of the receiver.

The registering mechanism will now be described: Supported upon the drum shaft 26 is a mutilated gear 38 having groups of teeth on its periphery which are instrumental in recording the removal of dimes and nickels. There are three groups of four teeth each for registering nickels, and two groups of nine teeth each for registering dimes. Suspended at 39 is a member 40 provided near its lower end with bearings for a shaft 41, which supports a sprocket wheel 42 connected by an endless chain 43 with another sprocket 44 fastened to the shaft 39 which supports the member 40. To the shaft 41 is secured a pinion 45, having ten teeth adapted to register with the groups of teeth on the gear 38. Adjacent the latter there is secured upon the shaft 26 a locking member 46 provided upon its periphery with alternate raised surfaces and depressions. The raised surfaces co-act with a star wheel 47 upon the shaft 41 to hold the latter immovable when engaged therewith, said star wheel being free to turn when one of the depressions on the face of the locking member is adjacent thereto. There are three of these depressions arranged in the same radial planes with the groups of four teeth on the gear 38 and two of these depressions arranged in the same radial planes with the groups of nine teeth. These groups of teeth and depressions conform in number and relative position with the flattened portions 32 and 34 of the drum 27.

Notches 48 are cut at two points in the periphery of the locking member 46 in positions corresponding to the flattened portions 33 of said drum. Immediately in advance of these notches, with reference to the direction of rotation of this member, pins 49 are provided which project out from the side thereof and are adapted to engage with the teeth of a gear 50 fastened to the shaft 41 adjacent the star wheel 47.

Supported by the frame 21 is a triangular bracket 51 comprising two similar plates held together by pins. Two of these pins 52 support sprockets 53 and the third thereof constitutes a shaft 54 upon which is secured a sprocket 55. An endless chain 56 passes around all of these sprockets, one leg thereof being arranged concentrically with the periphery of the drum and in close proximity thereto. A plurality of abutments 57 are arranged at intervals along the outside of the chain 56 in position to be engaged by coins held upon the flattened portions of the drum. Secured to the shaft 54 is a member 58 having three radial projections 59, as shown. The depending member 40 is provided with a cam face 60 adapted to co-act with the projecting surfaces of the member 58. A spring 61 engaging the member 40 tends to force the latter to the right, with reference to Fig. 7.

Secured to the hopper 18 is a clamp 62 and attached thereto is a spring member 63, which bends downwardly in close proximity to the drum 27 and is substantially concentric therewith. This spring acts to hold a coin in intimate contact with the flattened portion upon which it rests during the time that it is in engagement with an abutment 57 of the chain 56.

Figure 12:
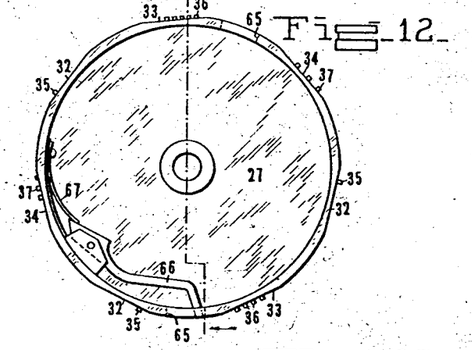
Fig. 12 is a detail view of the coin remover, other parts being omitted.
Figure 13:
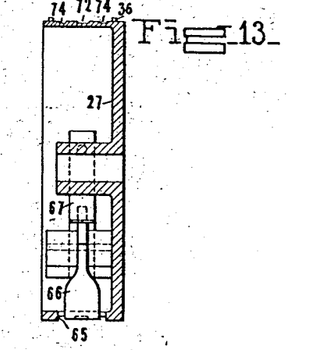
Fig. 13 is a cross-section taken on line *c—c* of Fig. 12.

A money drawer 64 provided with a lock is located in the lower part of the casing and receives the coins after they have moved out of contact with the abutments 57. The drum 27 has a hole 65 in its periphery intermediate two of the flattened portions thereof. A lever 66 is pivotally secured within the drum in such a position that the end thereof may be projected through this hole, but is normally held within the drum by means of a spring 67, as shown in Fig. 12. Secured to the hopper is an angular member 68, one end of which forms an abutment adapted to engage the lever 66 upon rotation of the drum, whereby the free end of said lever is projected through the opening 65.

Figures 14, 15, 16, 17, 18, 19, 20:
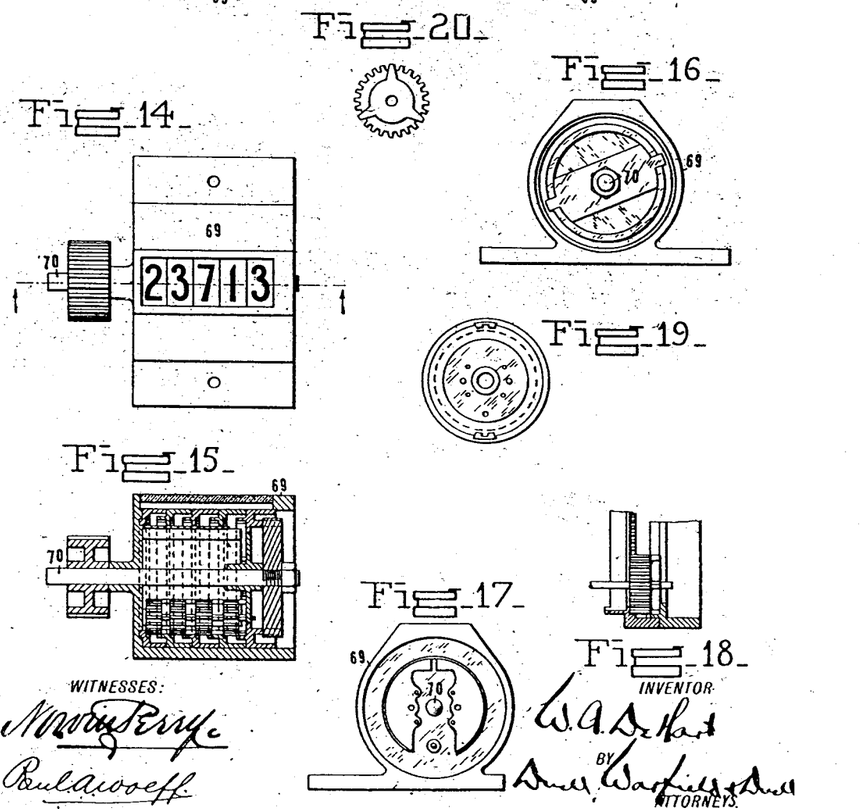
Figs. 14 to 20, inclusive, are detail views of the registering device.
Figure 21:
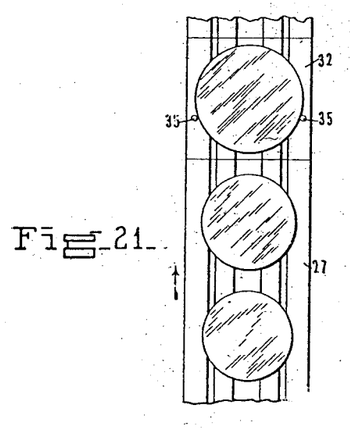
Figs. 21-26 show detail views of the means to selectively remove coins from the receiver.
Figure 22:
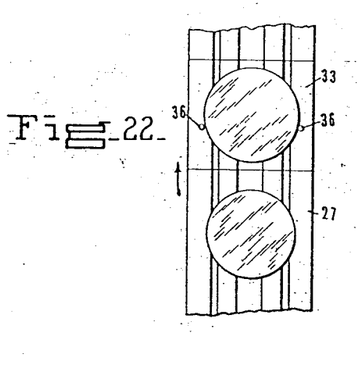
Figure 23:
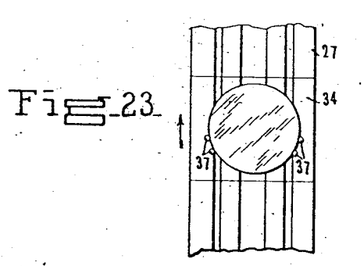
Figure 24:
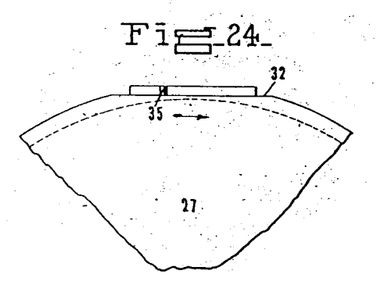
Figure 25:
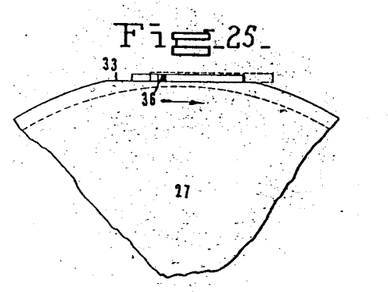
Figure 26:
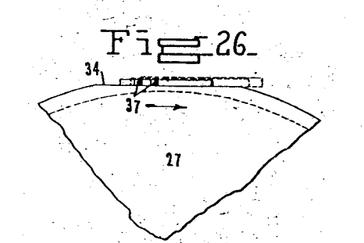

A register 69 is supported in the upper part of the fare-register, the shaft thereof being connected with intermediate gearing with the shaft 39 heretofore described. This register, as shown, has five revolving disks, the peripheries of which have numbers thereon adapted to indicate the number of fares paid. The first disk at the right of the register, as shown in Figs. 14 and 15, revolves with the register shaft 70. The figures thereon are arranged in two groups of from one to five each, and consequently register five twice during one complete revolution. The second disk has figures thereon arranged from one to ten and is connected to the first disk so as to advance one figure for each half revolution of the latter. The remaining disks each have figures on their periphery running from one to ten and are each adapted to advance one figure for every revolution of the next preceding disk.

Figures 9, 11:
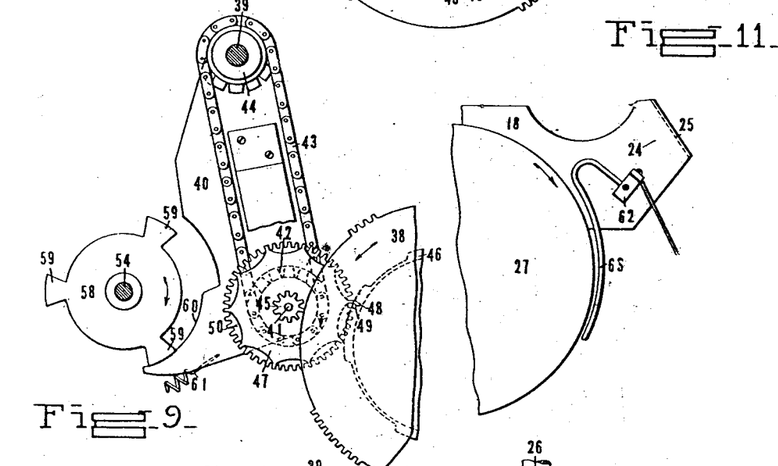
Fig. 9 is a view of the same with the mechanism locked and about to register the removal of a one-cent piece.
Fig. 11 is a view showing a portion of the removing drum and means adapted to hold a coin on the surface thereof during its removal.
Figure 10:
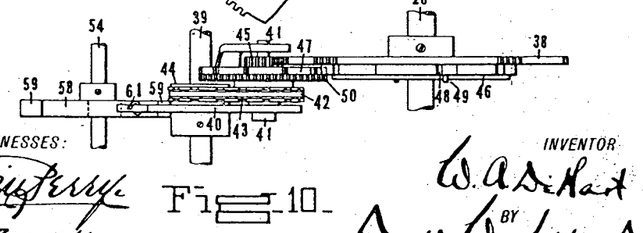
Fig. 10 is a bottom view of the parts shown in Fig. 8.

The operation of the registering mechanism follows: If a dime is being removed by the drum 27, the edge of the dime will come in contact with one of the abutments 57, whereby the chain 56 will be moved and the shaft 54 turned through a predetermined angle. The member 58 rotating with the shaft 54 engages the cam face 60 of the member 40 and forces said member toward the drum 27. The register actuating shaft 41 is carried therewith and the pinion thereon engages with one of the groups of nine teeth which is arranged with reference to the flattened portion 34 upon which the dime rests, so that the engagement shall be properly timed. The shaft 41 makes a complete revolution and imparts its rotation to the shaft 39 by means of the chain 43. The shaft 39 by means of intermediate gearing rotates the shaft of the register one complete revolution, the first disk turning therewith to cause the second disk to register two fares. Similarly, if a nickel is being removed, it engages an abutment of the chain 56 and rotates the member 58, so that the pinion 45 is brought into engagement with a group of four teeth upon the mutilated gear 38 at the proper moment to thereby register one fare. As soon as one of these groups of teeth passes out of mesh with the pinion 45, one of the raised surfaces of the member 46 engages two adjacent points of the star wheel 47, to lock the shaft 41 against rotation, as shown in Fig. 9. If a penny is being removed by the drum, the member 40 is swung toward said drum in time to permit one of the pins 49 to engage with a tooth of the gear 50 to turn the latter one-tenth of a revolution, whereby one-fifth of a fare is registered. Simultaneously with the engagement of the pin 49 with the gear 50, the notch 48 receives one of the points of the star wheel and permits the latter to turn with said gear. In case the coins have a tendency to stand on edge in the receiver, this is prevented by the lever 66, the end of which is momentarily projected through the opening 65 to strike any coin which may be resting on edge and, by agitating the same, will cause it to move out of its inclined position and rest upon the drum.

From the above description it will be seen that there is provided a device of this character in which the coins deposited by the passengers are registered before they are available to the conductor for making change, thereby avoiding a possibility of a dishonest employee taking money therefrom without such act being discovered.

Certain features herein described are described and claimed in my co-pending application, Serial No. 465,515, filed December 1, 1908, and consequently are not claimed in the present case.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent is:

1. In a device of the class described a receiving hopper, a rotatable coin carrying element adapted to selectively remove the coins therefrom, mechanism adapted to be driven by a coin on said element, a register, and actuating mechanism therefor adapted to be impelled into a position for operation by said coin driven mechanism.

2. In a device of the class described a receiving hopper, a rotatable coin carrying element adapted to selectively remove the coins therefrom, registering mechanism adapted to count the coins, actuating means for said registering mechanism, a cam element adapted to impel said actuating means into operating position, and mechanism driven by a coin carried on said element to operate said cam to impel said actuating means into proper position to register the coin.

3. In a device of the class described a receiving hopper for coins, a coin carrying element adapted to selectively remove coins therefrom, a register, actuating means for said register, means associated with said carrying element to operate said register actuating means, a rotatable cam adapted to impel said register actuating means into operating position, and means for driving said cam by a coin carried on said carrying element.

4. In a fare-register, in combination, a receiver adapted to receive coins of various denominations, means to selectively remove the coins therefrom, a register, means adapted to actuate said register, a pinion connected therewith, and a mutilated gear associated with said removing means adapted to engage said pinion and control said actuating means.

5. In a fare-register, in combination, a receiver adapted to receive coins of various denominations, means to selectively remove the coins therefrom, a register, means adapted to actuate said register, a pinion connected therewith, and a mutilated gear having a plurality of groups of teeth thereon adapted to engage said pinion.

6. In a fare-register, in combination, a receiver adapted to receive coins of various denominations, means to selectively remove the coins therefrom, a register, means adapted to actuate said register, a pinion connected therewith, and a mutilated gear associated with said removing means having a group of teeth thereon adapted to engage said pinion, whereby said register is actuated to indicate the removal of dimes.

7. In a fare-register, in combination, a receiver adapted to receive coins of various denominations, means to selectively remove the coins therefrom, a register, means adapted to actuate said register, a pinion connected therewith, a mutilated gear associated with said removing means provided with two groups of teeth which upon engagement with said pinion actuate said register to indicate the removal of dimes and further provided with three groups of teeth which upon engagement with said pinion actuate said register to indicate the removal of nickels.

8. In a device of the class described a register, pivotally mounted actuating mechanism therefor, a rotatable cam adapted to impel said mechanism into operating position, and mechanism associated with said cam adapted to be contacted and driven by a coin to impel said actuating register mechanism into operating position.

9. In a device of the class described a receptacle, a coin carrying element adapted to selectively remove coins therefrom, registering means for counting said coins, a pivoted frame, actuating mechanism for said register mounted on said frame, means associated with said carrying element adapted to move therewith and operate said registering actuating means when the same is moved into engagement therewith, a cam adapted to move said registering actuating means into operating position, a continuous chain for driving said cam, and lugs on said chain adapted to be contacted by coins on said carrying element to cause a movement of said cam and to impel the register actuating means into operating position to register said coins.

10. In a device of the class described a register, a pivoted frame, register actuating mechanism mounted on said frame, a cam for moving said frame to place said actuating mechanism into operating position, and mechanism adapted to be contacted by a coin passing through the device to positively rotate said cam to cause positioning of the elements and registering of the coin.

11. In a fare-register, in combination, a receiver adapted to receive coins of various denominations, a drum for removing the coins therefrom, a register, a drum-shaft, register actuating means, and means upon said drum-shaft adapted to drive said actuating means.

12. In a fare-register, in combination, a receiver adapted to receive coins of various denominations, a drum for removing the coins therefrom, a register, a drum-shaft, register actuating means, means upon said drum-shaft adapted to drive said actuating means, a pinion thereon, a mutilated gear on said drum-shaft adapted to engage said pinion, and means on said drum-shaft adapted to engage a member on said actuating means to hold the latter immovable.

13. In a fare-register, in combination, a receiver adapted to receive coins of various denominations, a drum for removing the coins therefrom, a register, a drum-shaft, register actuating means, a pinion thereon, a mutilated gear on said drum-shaft adapted to engage said pinion, a star-wheel associated with said actuating means, and locking means on said drum-shaft to engage said star-wheel.

14. In a fare-register, in combination, a receiver adapted to receive coins of various denominations, a drum for selectively removing the coins therefrom, a register, a drum-shaft, register actuating means, a pinion thereon, a mutilated gear on said drum-shaft having groups of teeth thereon adapted to engage said pinion, and means for locking said actuating means against rotation when said groups of teeth are disengaged from said pinion.

15. In a fare-register, in combination, a receiver adapted to receive coins of various denominations, a drum for selectively removing the coins therefrom, a register, a drum-shaft, register actuating means, a pinion thereon, a mutilated gear on said drum-shaft having groups of teeth thereon adapted to engage said pinion, a star-wheel carried by said actuating means, and a member on said drum-shaft adapted to co-act therewith to prevent rotation of said actuating means after a group of teeth has run out of mesh with said pinion.

16. In a fare-register, in combination, a receiver adapted to receive coins of various denominations, a drum for selectively removing the coins therefrom, a register, means adapted to actuate said register, a toothed wheel carried thereby, and a pin associated with said drum adapted to engage said toothed wheel to move said actuating device.

17. In a fare-register, in combination, a receiver adapted to receive coins of various denominations, a drum for selectively removing the coins therefrom, a register, means adapted to actuate said register, a toothed wheel carried thereby, and a pin associated with said drum adapted to engage said toothed wheel to move said actuating device, whereby said register indicates the removal of coins of a certain denomination.

18. In a fare-register, in combination, a receiver adapted to receive coins of various denominations, a drum for selectively removing the coins therefrom, a register, means adapted to actuate said register, a toothed wheel carried thereby, a drum-shaft, a disk carried thereon, and a pin on said disk adapted to engage said toothed wheel whereby said register is actuated.

19. In a fare-register, in combination, a receiver adapted to receive coins of various denominations, a drum for selectively removing the coins therefrom, a register, means adapted to actuate said register, a toothed wheel carried thereby, a drum-shaft, a disk carried thereon, a pin on said disk adapted to engage said toothed wheel whereby said register is actuated, and a member on said actuating means adapted to be engaged by said disk, whereby said actuating means is held immovable upon said pin passing out of mesh with said toothed wheel.

20. In a fare-register, in combination, a receptacle adapted to receive coins of various denominations, a drum for selectively removing the coins therefrom, a register, means adapted to actuate said register, a pinion connected therewith, a drum-shaft, a mutilated gear thereon having a plurality of groups of teeth adapted to engage said pinion, whereby said register is actuated to indicate the removal of dimes and nickels, a toothed wheel attached to said actuating means, and a member mounted upon said drum-shaft having pins thereon adapted to engage said toothed wheel whereby said register is actuated to indicate the removal of one-cent pieces.

21. In a fare-register, in combination, a receptacle adapted to receive coins of various denominations, a drum for selectively removing the coins therefrom, a register, means adapted to actuate said register, a pinion connected therewith, a drum-shaft, a mutilated gear thereon having a plurality of groups of teeth adapted to engage said pinion, whereby said register is actuated to indicate the removal of dimes and nickels, a toothed wheel attached to said actuating means, and a member mounted upon said drum-shaft having pins thereon adapted to engage said toothed wheel, whereby said register is actuated to indicate the removal of one-cent pieces, said member being formed and adapted to co-act with a member carried by said actuating means, to thereby hold the latter against rotation.

22. In a device of the class described a register, actuating means therefor, a pivoted frame supporting said actuating means, a cam surface on said frame, a rotatable cam adapted to contact said cam surface and impel said actuating means into operating position, a chain adapted to drive said cam, and means on said chain adapted to be contacted by a coin passing through the device to cause actuation of the cam and positioning of said mechanism to register said coin.

23. In a device of the class described a coin receiving hopper, a rotatable carrying element adapted to remove the coins therefrom, a continuous chain trained concentrically about said carrying element in close relation thereto, lugs on said chain adapted to be contacted by a coin on said element to cause a movement of said chain, a cam driven by said chain, a register, and actuating means for said register adapted to be impelled into operative position by movement of said cam.

24. In a fare-register, in combination, a register, a pivotally mounted member having a cam face, register actuating means supported and held thereby, and rotative means having a projection adapted to engage said cam face.

25. In a fare-register, in combination, a register, a pivotally mounted member having a cam face, register actuating means supported and held thereby, rotative means having a projection adapted to engage said cam face, and means adapted to drive said rotative means.

26. In a fare-register, in combination, a register, a pivotally mounted member having a cam face, register actuating means supported and held thereby, means for controlling said actuating means, and rotative means having a projection adapted to engage said cam face to bring said first two means into operative relation.

27. In a fare-register, in combination, a coin receiver, means to remove the coins therefrom, a register, a pivotally mounted member, register actuating means supported thereby, means associated with said removing means for controlling said actuating means, and means adapted to engage said pivotally mounted member whereby said actuating means is brought into operative relation with said controlling means.

28. In a fare-register, in combination, a coin receiver, means to remove the coins therefrom, a register, a pivotally mounted member having a cam face, register actuating means supported thereby, means associated with said removing means for controlling said actuating means, a rotative member adapted to engage said cam face, and means adapted upon the removal of a coin to be engaged thereby to impart movement to said rotative means to thereby bring said actuating means and said controlling means into operative relation.

29. In a fare-register, in combination, a receiver adapted to receive coins of various denominations, a drum to selectively remove the coins therefrom, a register, a pivotally mounted member, register actuating means supported thereby, a drum-shaft, means thereon adapted to control said actuating means, to thereby register coins of certain denominations, rotative means adapted to engage said pivotally mounted member, and means adapted upon the removal of a coin to be engaged thereby to impart movement to said rotative member and to bring said actuating means and said controlling means into operative relation.

30. In a fare-register, in combination, a receiver adapted to receive coins of various denominations, a drum having flattened peripheral portions for the removal of coins, a register, a pivotally mounted member, register actuating means supported thereon, a drum-shaft, a mutilated gear thereon, a pinion carried by said actuating means, a rotative member having projecting surfaces, and an endless chain provided with abutments adapted to be engaged successively by coins resting upon said flattened portions of said drum, to thereby impart motion to said rotative member, whereby said projecting surfaces engage said pivotally mounted member to bring said pinion and said gear into operative relation, to thereby register the value of the coin which momentarily engages one of said abutments.

31. In a fare-register, in combination, a register, register actuating means therefor, means for controlling said actuating means, means adapted to move said actuating means to an operative position with respect to said controlling means, whereby the former is intermittently driven, and means adapted to lock said actuating means against rotation during the intervals between driving.

32. In a fare-register, in combination, a receiver adapted to receive a plurality of coins, means to remove the coins therefrom, a register, register actuating means, means associated with said removing means adapted to control said actuating means, comprising means adapted to bring said actuating means and said controlling means in operative relation when coins are being removed and means for stopping the movement of said actuating means after the registration of each coin.

33. In a fare-register, in combination, a receiver adapted to receive a plurality of coins, means to remove the coins therefrom, a register, register actuating means, means associated with said removing means adapted to control said actuating means, comprising means adapted to bring said actuating means and said controlling means in operative relation when coins are being removed, and means associated with said removing means and adapted to co-act with said actuating means to stop the movement of the latter after the registration of each coin.

34. In a device of the class described a coin receptacle, a rotatable coin carrying element adapted to selectively remove coins therefrom, a pivoted lever mounted on said coin carrying element and adapted to rotate therewith, a spring normally impelling the same into retracted position, and fixed means adapted to contact said lever to positively project the same through an aperture in said coin carrying element against the stress of said spring.

35. In a device of the class described a rotatable coin carrying element, a lug formed on the interior thereof, a lever pivoted on said lug, a spring normally holding said lever in retracted position, and fixed means adapted to contact said lever during rotation of said element to positively project the end of said lever through an aperture in said element.

36. In a device of the class described a coin hopper, a rotatable coin carrying element adapted to remove coins selectively therefrom, a rotatable brush connected for rotation with said rotatable coin carrying element, and adapted to contact the surface thereof to prevent the passage of more than one coin at a time, a chain trained closely adjacent the face of said coin carrying element concentrically therewith for a portion of the length thereof, means on said chain adapted to be contacted by coins on said element to drive said chain, a rotatable cam connected to be driven by said chain, and coin registering mechanism adapted to be impelled into operating position to register the coin on the coin element, driving said chain, by said rotatable cam.

37. In a device of the class described a coin carrying element, a mutilated gear connected therewith, a continuous chain trained for a portion of its length concentrically over the surface of said coin carrying element, means on said chain adapted to be contacted by coins on said element to drive said chain, register means, mechanism for actuating said register means, normally out of engagement with said mutilated gear, a cam driven by said chain adapted to impel said register actuating mechanism into engagement with said mutilated gear, and a hopper to receive the coins discharged from said rotatable coin carrying element.

38. In a fare register, in combination, a receiver adapted to receive coins, means adapted to remove the coins therefrom, and a spring impelled pivoted lever mounted upon said removing means adapted to be projected into said receiver to agitate the coins therein.

39. In a fare register in combination, a receiver adapted to receive coins, means adapted to remove the coins therefrom, and a positively actuated pivoted lever adapted to agitate the coins within the receiver.

40. In a fare register in combination, a receiver adapted to receive coins, a vertically rotatable member adapted to remove coins therefrom, said member having an opening formed in its outer periphery, and means pivotally mounted within said member and adapted to rotate therewith and to be projected through said opening to agitate the coins within said receiver.

41. In a fare register in combination, a receiver adapted to receive coins, a rotary hollow drum provided with a plurality of peripheral coin engaging means to remove the coins from said receiver, said drum having an opening formed therein at a point intermediate adjacent coin engaging means, and means pivotally mounted within said drum and adapted to rotate therewith and to be projected through said opening to agitate the coin within the receiver.

42. In a receptacle for coins, in combination, an apertured partition dividing said receptacle into upper and lower chambers, means to admit coins to said upper chamber, means to discharge coins from said lower chamber, a depending tube surrounding the aperture in said partition, a ring held within said tube adjacent said aperture, a plurality of depending members pivotally supported by said ring, and means interposed between said chute and said partition adapted to prevent interference with said depending members.

43. In a fare-register, in combination, a coin receiver, means adapted to remove coins therefrom, a register, register actuating means, and means adapted to shift said actuating means into driving engagement comprising means adapted to prevent excessive movement in said actuating means.

44. In a fare-register, in combination, a coin receiver, means adapted to remove coins therefrom, a register, register actuating means, and means adapted to shift said actuating means into driving engagement comprising means to hold said actuating means immovable when said shifting means has ceased to act thereon.

In testimony whereof I affix my signature, in the presence of two witnesses.

WILLIAM A. DE HART.

Witnesses:
R. S. BLAIR,
H. M. SEAMANS.